Patented Mar. 26, 1946

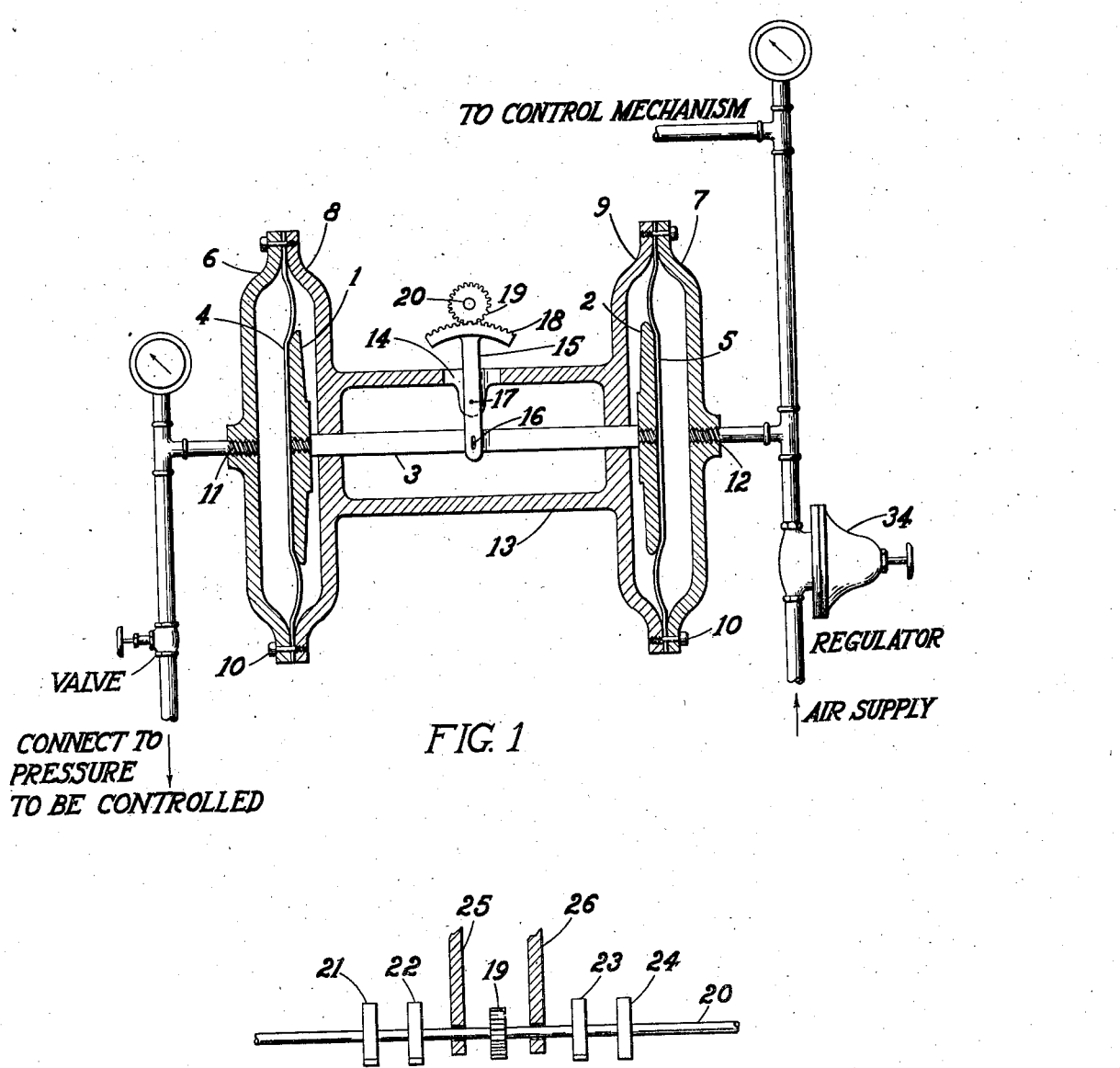

2,397,443

UNITED STATES PATENT OFFICE 2,397,443

PUMP STATION CONTROL SYSTEM

Thomas R. Statham, Camp Claiborne, La., and Edgar A. Koenig, Dallas, and Claude P. Caldwell, Greggton, Tex., assignors, by mesne assignments, to Socony-Vacuum Oil Company, Incorporated, New York, N. Y., a corporation of New York Application February 3, 1944, Serial No. 520,904

5 Claims. (Cl. 103—16)

This invention relates to a differential pressure master control device particularly intended for the control of a pumping station, such as is used on oil pipe lines, which will regulate the operation of motor driven pumps and valves over a wide range of flow conditions, and which will prevent the former from burning out in the event that the flow of oil to the pumping station is cut off for any reason.

In the operation of a pump station of this character it is customary to use gasoline or Diesel motor driven pumps because of their low operating costs and because the source of power therefor is readily available. Motors of this type are relatively restricted as to the speed range over which they may operate, and therefore, unless large storage capacity is provided at the pumping station so that the pump may operate over a relatively narrow range of pumping rates, regardless of wide fluctuations in the rate of flow, a plurality of pumps must be provided to take care of the variations in the flow rate.

Pressure actuated control devices wherein the force generated by the actuating pressure is opposed by a spring are well known. While such controllers are fairly accurate, the springs undergo change with age altering the accuracy and range of the instrument. Also, although such controllers are frequently provided with means whereby the pretension or precompression of the spring may be varied to alter the operating range of the controller, the springs acquire a preset in a particular operating range. After a short time, the spring actuated type of controller requires recalibration, or even replacement of the spring, in case it is desired to alter the operating range.

Differential pressure controllers have been proposed to eliminate the necessity for the use of springs. Such controllers are adapted to control in accordance with a fixed differential in pressure to be maintained, and operate by having the two pressures oppose two pistons on the opposite ends of the same shaft, or the opposite sides of a single piston. A change in the pressure differential will cause the piston or pistons and shaft to be displaced. This motion of the piston shaft may be utilized hydraulically or mechanically to effect a desired regulation. The opposed piston type of differential pressure controller is subject to disadvantages, however, as the clearance between piston and cylinder walls must be made very small in order to prevent leakage of the pressure actuating fluid by the pistons, causing the piston to stick, or else a considerable amount of leakage must be tolerated, lowering the accuracy of the instrument.

In order to eliminate the difficulties encountered with the use of opposed pistons in a differential pressure type of controller, the prior art has used two flexible diaphragms, centrally connected by a common shaft, with a suitable pressure tight head around each of the diaphragms. The pressures, in accordance with variations in which the controller is actuated, act upon the diaphragms, and connecting shaft. A change in the pressure difference causes the diaphragms to flex, displacing the shaft, and this displacement may be utilized to effect any desired regulation. While such a differential controller is accurate, so long as the diaphragms are in their central position, any deflection of the diaphragm acts to change the effective area of the diaphragms and, since the flexing of the diaphragms is in opposite directions, the effective areas do not undergo a similar change. Thus, after the initial displacement, the instrument is no longer accurate. In order to maintain sufficient accuracy, mechanical means actuated by motion of the diaphragm connecting shaft, have proven unsatisfactory, because of the limited amount of travel that can be tolerated. With this type of controller the prior art has generally resorted to some sort of hydraulic "servo" liquid, whose flow is controlled by the opening and/or closing of ports upon the movement of the diaphragm connecting shaft. With this type of controller, "hunting" due to overtravel of the servo fluid is objectionable, and an expensive adjunct to the controller in the form of a motor driven pump, and piping for the "servo" liquid is required.

An object of our invention is to provide a controller of the differential type which will have sufficient displacement of the pressure actuated parts to permit the use of mechanical means to effect the desired regulation. Another object is to provide a controller, the accuracy of which is not altered by the displacement of the pressure actuated parts within the working range of the instrument, that is free from leakage past the moving parts and that is free from any substantial tendency of the moving parts to stick.

Still another object of our invention is to provide a controller in which the pressure differential required to actuate the controller may be readily varied without in any way affecting the accuracy of the instrument.

A further object of the invention is to provide a master control device suitable for controlling the operation of a pumping station in which there is a plurality of pumps to handle flow fluctuations which is simple in construction, positive in operation and capable of adjustment over a wide range of operating conditions, whereby the need for storage capacity may be eliminated.

Other and further objects of our invention will be apparent from the description thereof, and from the appended claims.

Our invention may be best understood by reference to the following description of a pumping station controlled over the full range of operating conditions by the operation of the master control in connection with the drawings, in which:

Fig. 1 is a vertical view of the differential pressure master controller taken along the center line of the instrument and showing the casing and pistons in section.

Fig. 2 is a vertical view of the cam shaft actuated by the master controller showing the supporting hangers for the shaft in section.

Figure 3:
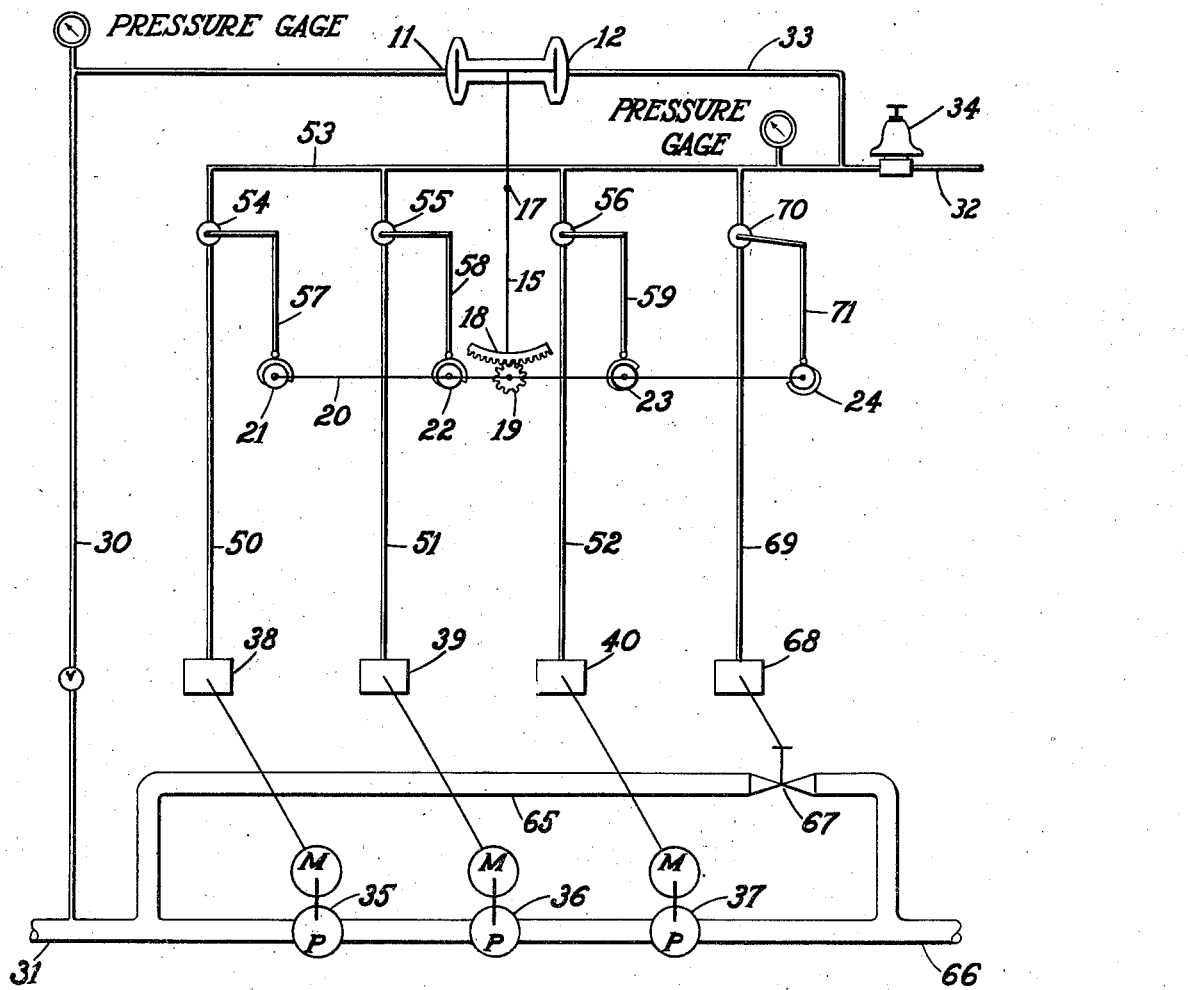
Fig. 3 is a schematic diagram of a pumping station controlled by the master controller so as to obtain a full range of control.

The differential pressure controller, shown in Fig. 1 of the drawings, consists of pistons, 1 and 2, screwed on to a common shaft, 3. The pistons rest against diaphragms, 4 and 5. The diaphragms are held between suitable flanges provided around the periphery of the outer diaphragm head cases, 6 and 7, and the inner diaphragm head cases, 8 and 9. Suitable screws or bolts, 10, are provided to hold the outer and inner diaphragm head cases together, retaining the diaphragm in position with a gas tight seal. Gaskets may be utilized between the diaphragms and the flanges, if desired, to render the diaphragm casing gas tight, particularly where the controller is to be utilized at considerable pressures, or in using metal diaphragms. Interiorly threaded openings, 11 and 12, are provided in the outer diaphragm cases, 6 and 7, for connecting to the diaphragm cases, of lines leading to the equipment actuating the controller. The inner diaphragm head cases are made integral with a tubular housing, 13, provided with a slot, 14, for the purpose to be later described. Since the areas of the diaphragms, 4 and 5, are the same, any difference in pressure between the fluid acting against diaphragm, 4, and that acting against diaphragm, 5, will produce an unbalanced force equal to the pressure differential times the effective displaceable area of the diaphragm, tending to displace the diaphragms, the pistons resting thereagainst, and the shaft connecting these pistons.

Motion of the shaft, 3, is utilized to effect the desired controlling action through corresponding displacement of the lever, 15, extending through slot, 14, in tubular housing, 13. This lever is provided with a yoke at the shaft connecting end, which permits the end of the lever to fit over the shaft. Pin, 16, extends through the yoke and shaft, 3, to connect the yoke to the shaft, and yet permit change in the angular relationship between the end of the lever and the shaft. The lever is pivoted at, 17, and the other end of the lever is provided with a rack gear, 18, in the form of a segment of a circle about the pivot, 17. Rack gear, 18, drives the pinion gear, 19, on shaft, 20. Rotation of shaft, 20, may be used to actuate suitable mechanical devices controlling the setting of valves, pressure regulators, motors, pumps and the like. By the use of the rack and pinion gears, 19 and 20, and by the proper choice of the length of the lever, 15, and position of pivot, 17, thereon, a small amount of displacement of shaft, 3, may be used to produce a desired amount of rotation of shaft, 20.

A preferred manner of effecting control action through rotation of shaft, 20, is to place a series of cams, such as cams, 21, 22, 23 and 24, on the shaft, as shown in Fig. 2 and diagrammatically in Fig. 3. Shaft, 20, is supported by bearings carried in suitable hangers, 25 and 26. Rotation of the cams may be used to effect a desired mechanical movement to operate the equipment to be controlled in accordance with a desired controlling action.

In describing the use of the above described controller as a master controller for a pumping station, reference is had to the schematic drawing of Fig. 3. The opening in one diaphragm head case, as the opening, 11, is connected by a suitable pipe, 30, to the suction or intake line, 31, of the pumping station. The opposite side of the master controller is connected to a source of compressed air by connecting lines, 32 and 33, to the opening, 12, in the opposite diaphragm head case. Pressure regulator, 34, in line, 32, may be used to regulate the controller to be responsive to any desired pressure value.

Motor driven pumps, 35, 36 and 37, are placed in series in the pumping station and are selected so that the capacity of the pumps is adequate to take care of the maximum possible load on the pumping station. The speed of operation of the driving motors for these pumps, to a certain extent, is regulated by the controllers, 38, 39 and 40, respectively. The operation of the motor controllers is, in turn, effected and controlled by air pressure in lines, 50, 51 and 52, respectively. These lines are connected to line, 53, which is in turn supplied with air at a constant pressure from line, 32, through regulator, 34. The pressure in lines, 50, 51 and 52, applied to the respective motor controllers is regulated by control valves, 54, 55 and 56, respectively. By attaching such a throttling device to the pilot valve it is possible to obtain a selection of any degree of throttling range of the pressure in line, 53, to be effective upon the motor controllers. The amount of throttling of the valves is regulated by cam shafts, 57, 58 and 59, respectively. The position of these cam shafts and hence the opening and closing of the valves is controlled by the rotation of the shaft, 20, effected by the master controller. A rise in intake pressure at, 31, therefore displaces the shaft connecting the pistons in the master controller because of an increase in pressure on the diaphragm in head case through opening, 11. This displacement of the controller shaft causes rotation of shaft, 20, in a direction to effect an increase in the amount of opening of valves, 54, 55 and 56. The increase in pressure from line, 53, acts upon the controllers to speed up the operation of the pumps, which speeding up continues until the intake pressure drops back to the normal value.

On the other hand when the intake pressure drops due to the receipt of less fluid at the pumping station than the combined capacity of the pumps at the operating speed, the operation of the master controller, rotation of shaft, 20, setting of valves, 54, 55 and 56, is reversed, causing the pump driving motors to slow down.

Since the amount of speed change possible in an internal combustion engine is limited, and since it would not be desirable to stop the motors, means are provided to by-pass any necessary portion of the pumping output where the minimum output of the pumps at the minimum motor operating speed exceeds the supply of fluid to the station. This is done by providing a by-pass line, 65, leading from the output station line, 66, back to the intake or suction line, 31. This line is provided with a normally closed valve, 67, whose opening and closing may be effected by the air pressure actuated controller, 68. Valve controller, 68, is regulated from the master controller in the same manner as the engine controllers, 38, 39 and 40, through pressure of air in line, 69, controlled by air valve, 70, whose position is determined by the position of cam, 24, and the motion transmitted through cam shaft, 71. Valve, 70, may be the same type as valves, 54, 55 and 56.

The position of cam, 24, on the shaft, 20, is so arranged that after controllers, 38, 39 and 40, have effected their maximum speed reducing action and further drop in pressure at suction line, 31, occurs, cam shaft, 71, is moved to effect an opening of valve, 70, on air line, 69, actuating valve controller, 68, an amount dependent upon the amount of opening of valve, 70. Valve controller, 68, effects the opening of by-pass valve, 67, so that a portion of the pumping station output will be by-passed to the suction line to prevent the pumps from losing suction and burning out.

It is thus apparent that by the use of a master controller of the type described in the manner described in combination with a suitable motor controller or motor controllers and a valve controller in a by-pass line from the output to the intake side of the pumping station, full range of control is possible in handling the load supplied to the station, and full protection is provided in case of a sharp or complete drop in the supply delivered to the station. This flexibility, moreover is achieved without the requirement of any storage capacity or constant attendance of an operator.

Many modifications of our invention will be apparent to those skilled in the art, and the specific subsidiary control devices referred to in the description of the adaptation of the master controller to a pumping station operation are given by way of illustration only. Our invention should not be considered as limited to the specific form shown but only as indicated in the appended claims.

We claim:

1. A pump station control system comprising in combination, an intake line, an outlet line and a motor driven pump connected to the intake and outlet lines for pumping fluid delivered to said station, a by-pass line from the outlet to the intake side of said station, a normally closed valve in said by-pass line, a controller for opening and closing said valve, a speed controller for said motor, a fluid pressure differential actuated master control device comprising a pair of shaft connected pistons, a pair of pressure chambers, a flexible diaphragm in each chamber, said pistons being positioned in said chambers with their remote ends disposed in contact with the adjacent faces of said flexible diaphragms and their connecting shaft extending through centrally disposed openings in the adjacent sides of said pressure chambers, means for admitting fluid from the intake line to one of said pressure chambers on the remote side of the diaphragm therein, means for admitting fluid at a predetermined constant pressure to the other pressure chamber on the remote side of the diaphragm therein, a pivoted lever one end of which is connected to the piston connecting shaft and the other end of which is provided with a rack gear, a shaft mounted pinion gear engaging said rack gear, means on said pinion shaft, rotatable therewith, for actuating said motor controller and said valve controller whereby the speed of said pump may be regulated in accordance with the pressure in the intake line and the by-pass valve may be opened to deliver fluid from the outlet to the inlet line in case the fluid pressure in the inlet line falls below a predetermined minimum value.

2. A pump station control system comprising in combination, an intake line, an outlet line and a motor driven pump connected to the intake and outlet lines for pumping fluid delivered to said station, a by-pass line from the outlet to the intake side of said station, a normally closed valve in said by-pass line, a controller for opening and closing said valve, a speed controller for said motor, a fluid pressure differential actuated master control device comprising a pair of shaft connected pistons, a pair of pressure chambers, a flexible diaphragm in each chamber, said pistons being positioned in said chambers with their remote ends disposed in contact with the adjacent faces of said flexible diaphragms and their connecting shaft extending through centrally disposed openings in the adjacent sides of said pressure chambers, means for admitting fluid from the intake line to one of said pressure chambers on the remote side of the diaphragm therein, means for admitting fluid at a predetermined constant pressure to the other pressure chamber on the remote side of the diaphragm therein, means mechanically connected to the piston connecting shaft for actuating said motor controller and said valve controller whereby the speed of said pump may be regulated in accordance with the pressure in the intake line and the by-pass valve may be opened to deliver fluid from the outlet to the inlet line in case the fluid pressure in the inlet line falls below a predetermined minimum value.

3. A fluid pressure differential actuated control device comprising in combination a pair of shaft connected pistons, a pair of pressure chambers, a flexible diaphragm in each chamber, said pistons being positioned in said pressure chambers with their remote ends disposed in contact with the adjacent faces of said flexible diaphragms and their connecting shaft extending through centrally disposed openings in the adjacent sides of said pressure chambers, means for admitting the fluids in accordance with whose pressure differentials the control device is activated to said pressure chambers on the remote sides of said diaphragms, a pivoted lever one end of which is connected to the piston connecting shaft and the other end of which is provided with a rack gear, a shaft mounted pinion gear engaging said rack gear, a cam on said shaft, a camshaft actuated by said cam for the actuation of the means to be controlled in accordance with the pressure difference of the fluids in said pressure chambers.

4. A fluid pressure differential actuated control device comprising in combination a pair of shaft connected pistons, a pair of pressure chambers, a flexible diaphragm in each chamber, said pistons being positioned in said pressure chambers with their remote ends disposed in contact with the adjacent faces of said flexible diaphragms and their connecting shaft extending through centrally disposed openings in the adjacent sides of said pressure chambers, means for admitting the fluids in accordance with whose pressure differentials the control device is activated to said pressure chambers on the remote sides of said diaphragms, a pivoted lever one end of which is connected to the piston connecting shaft and the other end of which is provided with a rack gear, a shaft mounted pinion gear engaging said rack gear, means on said pinion shaft, rotatable therewith, for actuation of the means to be controlled in accordance with the pressure difference of the fluids in said pressure chambers.

5. A fluid pressure differential actuated control device comprising in combination a pair of shaft connected pistons, a pair of pressure chambers, a flexible diaphragm in each chamber, said pistons being positioned in said pressure chambers with their remote ends disposed in contact with the adjacent faces of said flexible diaphragms and their connecting shaft extending through centrally disposed openings in the adjacent sides of said pressure chambers, means for admitting the fluids in accordance with whose pressure differentials the control device is activated to said pressure chambers on the remote sides of said diaphragms, a pivoted lever connected to the piston connecting shaft and provided at one end with a rack gear, a shaft mounted pinion gear engaging said rack gear, means on said pinion shaft rotatably therewith for actuation of the means to be controlled in accordance with the pressure difference of the fluids in said pressure chambers.

THOMAS R. STATHAM.
EDGAR A. KOENIG.
CLAUDE P. CALDWELL.